United States Patent
Boykov et al.

(10) Patent No.: US 7,444,019 B2
(45) Date of Patent: Oct. 28, 2008

(54) SYSTEM AND METHOD FOR GPU ACCELERATION OF PUSH-RELABEL ALGORITHM ON GRINDS

(75) Inventors: Yuri Boykov, London (CA); Gianluca Paladini, Princeton, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 710 days.

(21) Appl. No.: 11/058,336

(22) Filed: Feb. 15, 2005

(65) Prior Publication Data

US 2005/0213837 A1    Sep. 29, 2005

Related U.S. Application Data

(60) Provisional application No. 60/545,588, filed on Feb. 18, 2004.

(51) Int. Cl.
  *G06K 9/00*    (2006.01)
  *G06K 9/34*    (2006.01)

(52) U.S. Cl. ................ 382/173; 382/164; 382/180

(58) Field of Classification Search ............. 382/164, 382/173, 176–180; 358/462
See application file for complete search history.

(56) References Cited

U.S. PATENT DOCUMENTS 6,744,923 B1 *   6/2004   Zabih et al. .............. 382/226
7,212,201 B1 *   5/2007   Geiger et al. ............. 345/420
2002/0122044 A1 *   9/2002   Deering .................... 345/597
2005/0081175 A1 *   4/2005   Scott et al. ................ 716/12

OTHER PUBLICATIONS

Goldberg et al. ("A New Approach to the Maximum-Flow Problem," J. ACM, vol. 35, No. 4, Oct. 1998, pp. 921-940).*
Cherkassky et al. ("On Implementing Push-Relabel Method for the Maximum Flow Problem," TR-94-1523, Stanford University, 1994).*
Boykov et al. (Interactive Graph Cuts for Optimal Boundary & Region Segmentation of Objects in N-D Images, Proc. Int'l Conf. on Computer Vision, vol. 1, Jul. 2001, pp. 105-112).*

* cited by examiner

*Primary Examiner*—Yubin Hung
(74) *Attorney, Agent, or Firm*—Donald B. Paschburg; F. Chau & Associates, LLC

(57) ABSTRACT

A method of segmenting an image includes representing an image by a grid with a plurality of nodes, terminals, and edges, the terminals including a source and a sink. The edges include n-links and t-links, where each n-link connects a pair of nodes, and the t-links connect a node to a terminal, and each t-link and n-link has an associated cost. The method includes initializing a node height table, a flow excess table, a t-link capacity table, and an n-link capacity table based on the t-link and n-link costs, and updating the node height table, the flow excess table, the t-link capacity table, the said n-link capacity table in parallel for all nodes until the flow excess table is zero for all nodes. The method steps are performed in parallel for all nodes on a graphics processing unit.

18 Claims, 6 Drawing Sheets

```
def STOP(X) : X(p)=0 for all p∈P initialize data structures
while(!STOP(X)) do
    for (counter = 0; counter < max_counter; counter ++)
        pulse processing
    global relabeling (D = FRAG_BSF(T, E_n: n∈N))
return node heights D // if D(p)≥D_s then p∈V_s else p∈V^t
```

FIG. 1: General outline

```
initialize data structures:
initialize excess and t_links: X,T = FRAG_XT_INIT(C_s, C_t)
for n∈N
    initialize n_links: E_n = FRAG_COPY(C_n)
initialize heights: D = FRAG_BFS(T, E_n: n∈N)
```

FIG. 2

```
FRAG_XT_INIT(C_s, C_t):
    for each node p∈P
        T(p) = C_s(p) - C_t(p)
        X(p) = (T(p) ≥ 0) ? T(p) : 0
```

FIG. 3

```
FRAG_BFS(T, E_n : n∈N):
for each node p∈P
    D(p)= (T(p) > 0)?   D_s + 1
        :(T(p) < 0)?   D_t + 1
        :(T(p) = 0)?   2*D_s
for (counter = 0; counter < |V|; counter ++)
    for each node p∈P
        tmp(p) = D(p)
        for each n∈N
            if E_n(P) > 0 then
                tmp(p)=min{tmp(p), D(p+n)+1}
    for each node p∈P
        D(p) = tmp(p)
```

FIG. 4

```
FRAG_COPY(C_n)
    for each node p ∈ P
        E_n(p) = C_n(p)
```

FIG. 5

```
Pulse processing ( version 1):
find t_link pushes: F = FRAG_T_PUSH(D,X,T)
update excess and t_links: X,T = FRAG_T_UPDATE(F, X, T)
for n∈N/2 (once for every distinct pair {n,rev(n)})
    find n_link pushes: F = FRAG_N_PUSH(n,D,X,E_n,E_rev(n))
    update excess and n_links:
        X, E_n, E_rev(n) = FRAG_N_UPDATE(n, F, X, E_n, E_rev(n))
relabel the nodes: D = FRAG_RELABEL(D,T,E_n: n∈N)
```

FIG. 6

```
Pulse processing (version 2):
find t_link and n_link pushes:
    F_t,F_1,...,F_N/2 = FRAG_PUSH(D,X,T,E_n: n∈N)
update t_links and excess: X,T = FRAG_T_UPDATE(F_t,X,T)
for n∈N/2 (once for every distinct pair {n,rev(n)})
    update excess and n_links:
        X, E_n, E_rev(n) = FRAG_N_UPDATE(n, F_n, X, E_n, E_rev(n))
relabel the nodes: D = FRAG_RELABEL(D,T,E_n: n∈N)
```

FIG. 7

```
F = FRAG_T_PUSH(D, X, T):
for each node p ∈ P
    F(p) = (T(p)>0 and D(p)=D_s+1)?  min{T(p),X(P)}
         : (T(p)<0 and D(p)=D_t+1)?  -min{-T(p), X(p)}
         :                           0
```

FIG. 8

```
FRAG_T_UPDATE(F,X,T):
for each node p ∈ P
    X(p) -= |F(p)|
    T(p) -= F(p)
```

FIG. 9

```
F = FRAG_N_PUSH(n, D, X, E_n, E_rev(n)):
for each node p ∈ P
    F(p) = (D(p)=D(p+n)+1)?  min{E_n(p), X(p)}
         : (D(p)=D(p+n)-1)?  -min{E_rev(n)(p+n), X(p+n)}
         :                   0
```

FIG. 10

```
FRAG_N_UPDATE(n, F, X, E_n, E_rev(n)):
for each node p ∈ P
    X(p) -= (F(p)-F(p-n))      // Note: p-n = p + rev(n)
    E_n(p) -= F(p)
    E_rev(n)(P) += F(p-n)
```

FIG. 11

```
FRAG_RELABEL(D, T, E_n : n ∈ N):
for each node p ∈ P
    tmp(p) = (T(p)>0)?    D_s+1
           : (T(p)<0)?    D_t+1
           : (T(p)=0)?    2*D_s
    for each n ∈ N
        if E_n(p)>0 then tmp(p) = min{tmp(p), D(p+n)+1}
for each node p ∈ P
    D(p) = tmp(p)
```

FIG. 12

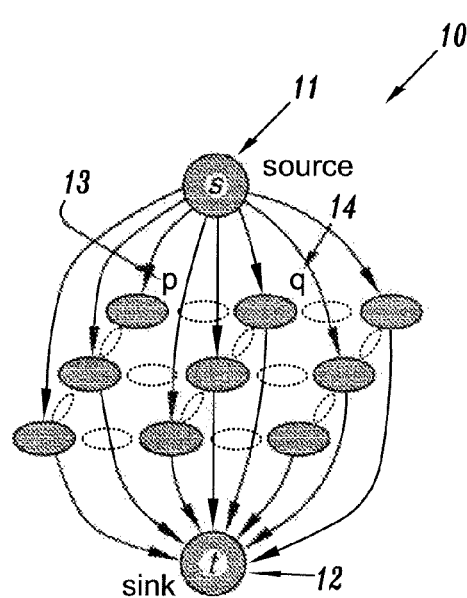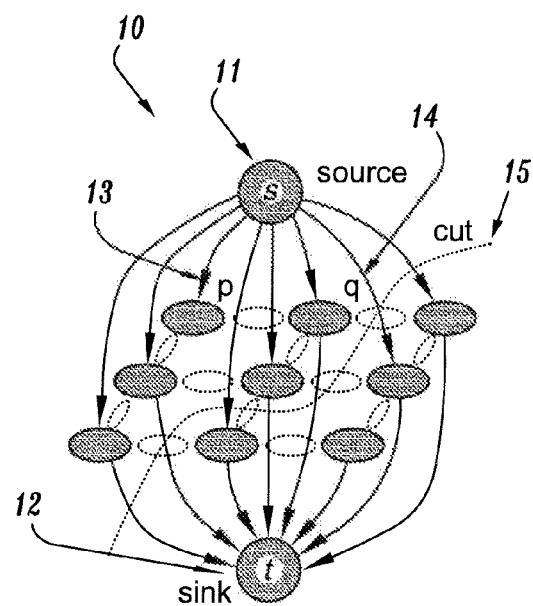
A graph $\mathcal{G}$
FIG. 14(a)
A cut on $\mathcal{G}$
FIG. 14(b)

SYSTEM AND METHOD FOR GPU ACCELERATION OF PUSH-RELABEL ALGORITHM ON GRINDS

CROSS REFERENCE TO RELATED UNITED STATES APPLICATIONS

This application claims priority from "GPU ACCELARATION OF PUSH-RELABEL ALGORITHM ON GRIDS", U.S. Provisional Application No. 60/545,588 of Yuri Boykov, et al., filed Feb. 18, 2004, the contents of which are incorporated herein by reference.

TECHNICAL FIELD

This invention relates to a method for graph cuts useful in image segmentation to separate an object of interest in an image from the background of the image.

DISCUSSION OF THE RELATED ART

Many real life applications can benefit from methods that can reliably segment out objects in images by finding their precise boundaries. One important example is medical diagnosis from 2-D and 3-D MR or CT images used by doctors to investigate various organs of their patients. Four-dimensional medical images containing information about 3-D volumes moving in time are also known. These images usually present to the viewer overwhelming quantities of information such as to reveal a need for tools that would enable the viewer to focus on relevant parts of these images. Precise segmentation of organs would allow accurate measurement, simplify visualization and, consequently, make the diagnosis more reliable.

Combinatorial graph cut techniques are used in many applications in computer vision, including image segmentation. Using graph cuts, an image can be optimally divided into a plurality of parts to minimize the maximum cut between the segments. In this formulation, however, the segmentation is strongly biased to very small segments. Graph cuts can be used to minimize certain energy functions used in image restoration, stereo, and other early vision problems. Ideally, one would like to have a segmentation based on both region and boundary information. There are many attempts to design such methods, generally involving numerical optimization. Typical schemes use variational approaches leading to a local minimum. In some cases that combine region and boundary information, a globally optimal segmentation is possible through graph based methods.

Graph cuts provide high quality solutions but their speed is still far from real time, due to the performance of the underlying combinatorial optimization algorithms. However, recent advances in graphics processing unit (GPU) technology show a great potential for speeding up certain parallel computations. The problem is that the corresponding algorithms must fit GPU's highly restricted architecture originally designed for applications in graphics. One common combinatorial optimization algorithm for computing minimum cost cuts on directed graphs is the push-relabel algorithm. It is known that the push-relabel algorithm allows parallel implementations. Previously, several parallel implementations were proposed for a number of specific multi-processor machine architectures. Limitations of GPU architecture make it a particularly good match for regular grid graphs which are typical in computer vision.

SUMMARY OF THE INVENTION

Exemplary embodiments of the invention as described herein generally include methods and systems for a parallel implementation of a push-relabel graph cut algorithm on a graphics processing unit.

In an aspect of the invention, there is provided a method of segmenting an image including representing an image by a grid with a plurality of nodes, terminals, and edges, wherein said nodes correspond to voxels in the image, said terminals include a source and a sink, and wherein said edges include n-links and t-links, wherein each n-link connects a pair a nodes, and said t-links connect a node to a terminal, and wherein each t-link and n-link has an associated cost, initializing a node height table, a flow excess table, a t-link capacity table, and an n-link capacity table based on the t-link and n-link costs, and updating said node height table, said flow excess table, said t-link capacity table, and said n-link capacity table in parallel for all nodes until said flow excess table is zero for all nodes, wherein said nodes are segmented into a sink set and a source set based on the values of the node height table.

In further aspect of the invention, the parallel updating of said node height table, said flow excess table, said t-link capacity table, and said n-link capacity table is performed on a graphics processing unit.

In further aspect of the invention, the method includes periodically recalculating the node height table in parallel for all nodes, based on updated values of the t-link capacity table and the n-link capacity table.

In further aspect of the invention, each n-link is associated with a reverse n-link among the n-links, and wherein said parallel updating includes determining for all nodes in parallel a t-link push based on the t-link capacity table and the flow excess table, and using the t-link push to update the t-link capacity table and flow excess table in parallel for all nodes, determining for all nodes in parallel an n-link push function based on the n-link capacity table and the flow excess table, and using the n-link push to update the n-link capacity table and flow excess table in parallel for all nodes, wherein the step of determining an n-link push and updating the n-link capacity table and flow excess table is repeated for every n-link pair comprising an n-link and its reverse, and updating the node height table based on the updated t-link capacity table and updated n-link capacity table, for all nodes in parallel.

In further aspect of the invention, each n-link is associated with a reverse n-link among the n-links, and wherein said parallel updating further includes determining for all nodes in parallel an n-link push and a t-link push based on the n-link capacity table, the t-link capacity table and the flow excess table, updating the t-link capacity table from the t-link push in parallel for all nodes, updating the n-link capacity table from the n-link push in parallel for all nodes, wherein the step of determining an n-link push and updating the n-link capacity table and flow excess table is repeated for every n-link pair comprising an n-link and its reverse, updating the flow excess table from the n-link push and t-link push in parallel for all nodes, and updating the node height table based on the updated t-link capacity table and updated n-link capacity table, for all nodes in parallel.

In further aspect of the invention, the step of periodically recalculating the node height table further includes reinitializing, in parallel for all nodes, the node heights from a source height and a sink height, as determined by the t-link capacity table, determining in parallel for all nodes and for all n-links a temporary height table, based on the n-link capacity table, and updating the node height table from the temporary height table, in parallel for all nodes, wherein the steps of determining a temporary height table and updating the node height table are repeated for all nodes and terminals.

In further aspect of the invention, the step of updating the flow excess table further includes initializing, in parallel for all nodes, a temporary height table from a source height and a sink height, as determined by the t-link capacity table, and, for each n-link, updating said temporary height table based on the n-link capacity table, and updating in parallel for each node the node height table from the temporary height table.

In further aspect of the invention, the step of updating the flow excess table further includes initializing, in parallel for all nodes, a temporary height table from a source height and a sink height, as determined by the t-link capacity table, and, for each n-link, updating said temporary height table based on the n-link capacity table, and updating in parallel for each node the node height table from the temporary height table.

In another aspect of the invention, there is provided a system for partitioning a grid, said grid comprising a plurality of nodes, terminals, and edges, said terminals include a source and a sink, and wherein said edges include n-links and t-links, wherein each n-link connects a pair a nodes, and said t-links connect a node to a terminal, and wherein each t-link and n-link has an associated cost, said system comprising a node height table, a flow excess table, a t-link capacity table, an n-link capacity table, a plurality of initialization procedures for initializing said node height table, said flow excess table, said t-link capacity table, and said n-link capacity table, and a plurality of pulse processing procedures for updating said node height table, said flow excess table, said t-link capacity table, and said n-link capacity table, wherein said pulse processing procedures are executed until a stopping criteria is satisfied, and wherein said plurality of initialization and said pulse processing procedures are fragment programs executable in parallel for each node in the grid by a graphics processing unit.

In a further aspect of the invention said pulse processing procedures include a plurality of fragment programs for calculating a t-link push table from said t-link capacity table and flow excess table based on said node height table, a plurality of fragment programs for updating said t-link capacity table and flow excess table from said t-link push table, a plurality of fragment programs for calculating an n-link push table from said n-link capacity table and flow excess table based on said node height table, a plurality of fragment programs for updating said n-link capacity table and flow excess table from said n-link push table, and a plurality of fragment programs for updating said node height table from said n-link capacity table and said t-link capacity table, wherein said fragment programs are executable in parallel for each node in the grid by a graphics processing unit.

In further aspect of the invention, the system further includes a plurality of fragment procedures for performing a global relabeling of said node height table, wherein said fragment programs are executable in parallel for each node in the grid by a graphics processing unit.

BRIEF DESCRIPTION OF THE DRAWINGS

FIG. 1 presents a pseudo-code outline of a parallel push-relabel algorithm according to an embodiment of the invention.

FIG. 2 presents a pseudo-code implementation of an initialization procedure for the data structures according to an embodiment of the invention.

FIG. 3 presents a pseudo-code implementation of a procedure for initializing flow excess tables and t-link capacity tables, according to an embodiment of the invention.

FIG. 4 presents a pseudo-code implementation of a procedure which initializes and relabels the node height table according to an embodiment of the invention.

FIG. 5 presents a pseudo-code implementation of a procedure which initializes the n-link capacities according to an embodiment of the invention.

FIG. 6 presents a pseudo-code implementation of a pulse processing procedure according to an embodiment of the invention.

FIG. 7 presents a pseudo-code implementation of another pulse processing procedure according to an embodiment of the invention.

FIG. 8 presents a pseudo-code implementation of a procedure for calculating t-link pushes, according to an embodiment of the invention.

FIG. 9 presents a pseudo-code implementation of a procedure for updating t-link capacities and flow excess, according to an embodiment of the invention.

FIG. 10 presents a pseudo-code implementation of a procedure for calculating n-link pushes, according to an embodiment of the invention.

FIG. 11 presents a pseudo-code implementation of a procedure for updating n-link capacities and flow excess, according to an embodiment of the invention.

FIG. 12 presents a pseudo-code implementation of a procedure for relabeling the nodes, according to an embodiment of the invention.

FIG. 14a depicts an exemplary directed graph with a source and a sink, according to an embodiment of the invention.

FIG. 14b depicts an exemplary graph with a cut dividing those nodes connected to the source from those nodes connected to the sink.

DETAILED DESCRIPTION OF THE PREFERRED EMBODIMENTS

Figure 13:
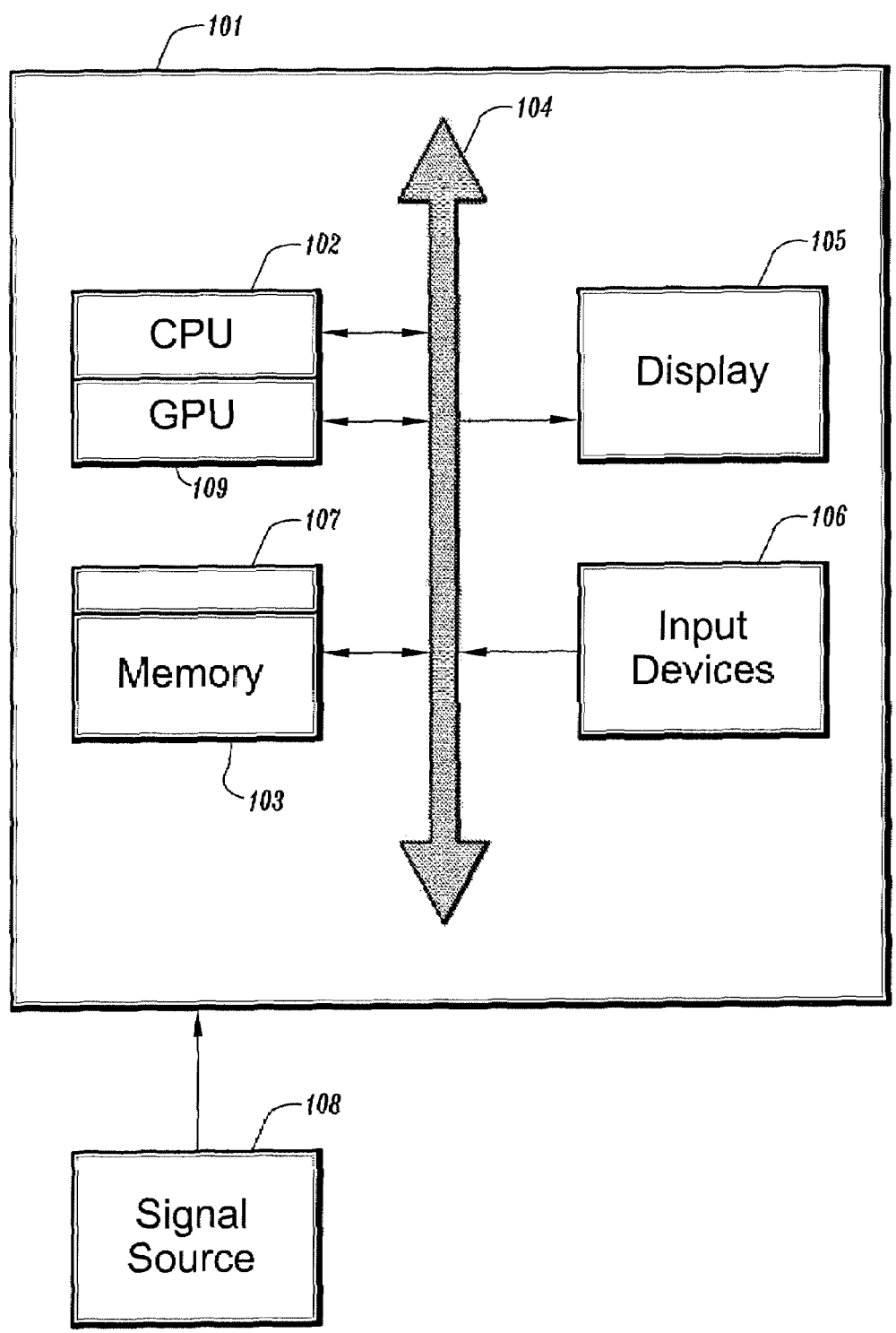
FIG. 13 depicts an exemplary computer system for implementing a preferred embodiment of the invention.

Exemplary embodiments of the invention as described herein generally include systems and methods for GPU-based acceleration of the push-relabel algorithm on grids. In the interest of clarity, not all features of an actual implementation which are well known to those of skill in the art are described in detail herein.

Medical images, such as MR, CT, PET, US, etc., images, can be represented as a particular type of graph known as a grid. In a grid, each node of the graph has the same number of connections to other nodes in the graph, and the topology of the connections is the same for each node. For example, in a 2-dimensional rectangular grid, each node would be connected to its 4 nearest-neighbor nodes. Since the pixels or voxels in a medical image typically form regular arrays with predetermined, constant spacings, a medical image can easily be represented as a rectangular grid-type graph. The edges between nodes in a grid resenting a medical image can be representative of the difference between the two connected pixels, such as, the difference in pixel intensities. Note that pixels in three-dimensional images are referred to as "voxels" and will usually have an opacity component that is normally absent in two-dimensional pixels. Nevertheless, for simplicity, the term "pixel" in this specification also encompasses "voxel" in the 3-D context.

Segmenting an image involves grouping pixels that correspond to a same object of interest. To segment an image, a graph is created with image nodes corresponding to pixels of the image. There are two additional terminal nodes: an "object" terminal (a source) and a "background" terminal (a sink). The source is connected by edges to all image nodes identified as object seeds and the sink is connected to all background seeds. The identification of image pixels as "object" or "background" can be based, for example, on the relative intensity of a pixel, and serves as a preliminary step to segmenting all pixels corresponding to the object form those pixels corresponding to the background. For convenience, all edges from the terminals are referred to as t-links. An infinite cost can be assigned to all t-links between the seeds and the terminals.

Pairs of neighboring pixels are connected by weighted edges referred to as n-links (neighborhood links). Any kind of neighborhood system can be used, such as a local intensity gradient magnitude, and Laplacian zero-crossing, gradient direction, and other criteria. An example of a directed graph 10 with a source 11 and a sink 12 is shown in FIG. 14a, while FIG. 14b depicts the graph 10 with a cut 15 dividing those nodes connected to the source from those nodes connected to the sink. Note that nodes p 13 and q 14 in FIG. 14a are both connected to the source terminal, and are included with the other nodes connected to the source by the cut in FIG. 14b.

With this general graph structure, the segmentation boundary between the object and the background can be drawn by finding the minimum cost cut on this graph. A cut is a subset of edges that separates the source from the sink. A cost of the cut is a sum of its edge costs. Due to the infinite cost of t-links to the seeds, a minimum cut is guaranteed to separate the object seeds from the background seeds. Note that locations with high intensity gradients correspond to cheap n-links. Thus, they are attractive for the optimal segmentation boundary. The minimum cut can be computed exactly in polynomial time using the push-relabel algorithm.

The push-relabel algorithm is a combinatorial optimization algorithm for computing minimum cost s/t cuts on directed graphs. An exemplary, non-limiting graph is a grid G=[V,E] where the set of vertices V={P, s, t} includes grid-nodes (pixels) p and terminals s (source) and t (sink). The set of directed edges E={T, $\mathcal{E}_n$:n∈N} includes t-links T={(p, s),(p, t): p∈P} connecting nodes to the terminals, and several families of n-links $\mathcal{E}_n$={(p, p+n) : p∈P} connecting neighboring grid-nodes in a regular fashion. Each family $\mathcal{E}_n$ contains one directed n-link (p, p+n) for each node p∈P, where q=(p+n)∈P is a neighboring node that can be obtained by shifting from p by a given vector n. The set N of all vectors/shifts n describes a neighborhood system or topology on the grid P. It can be assumed without limitation that for any n∈N there exists a reverse vector/shift rev(n)∈N such that n=−rev(n). This definition of a grid-graph is exemplary and non-limiting and can describe regular grids of any dimension.

The minimum s/t cut problem on a graph concerns finding a binary partitioning of graph vertices into two subsets $V_s$ and $V_t$, such that the terminals are separated (s∈$V_s$,t∈$V_t$) and the sum of costs for all edges that originate at some vertex p∈$V_s$ and terminate at some vertex q∈$V_t$ is as small as possible. An instance of the minimum s/t cut problem on a grid of any given size and fixed topology N can be specified by a set of costs of t-links to the source, $C_s$={$C_s$(p): p∈P}, a set of costs of t-links to the sink, $C_t$={$C_t$(p): p∈P}, and by a set of cost of n-links, $C_n$={$C_n$(p): p∈P}, for all n∈N. The push-relabel algorithm can perform this partitioning for any two terminal graphs. These algorithms maintain a labeling of nodes giving a low bound estimate on the distance to the sink along non-saturated edges. The algorithms attempt to push excess flows towards nodes with smaller estimated distances to the sink. Typically, the push operation is applied to nodes with the largest distance or label, or is based on a first-in/first-out (FIFO) selection strategy. The distances (labels) progressively increase as edges are saturated by push operations. Undeliverable flows are eventually drained back to the source.

Graphics processing units (GPUs) are highly parallel processors that have been developed to accelerate the processing and display of complex, realistic 3-dimensional images on 2-dimensional computer monitor. The parallelism of a GPU is restricted, as a GPU is optimized for processing regular grids, and so not every type of parallel algorithm can be adapted for execution on a GPU. However, since the image displayed on a computer monitor forms a 2-dimensional grid, a GPU would appear to be adaptable for the processing involved in analyzing medical images, such as, for example, segmentation.

An outline a GPU-based implementation of a parallel push-relabel algorithm according to an embodiment of the invention is shown in FIG. 1. In order to explain this implementation, the following data structures can be used.

$D_s$: a constant representing the fixed height of the source: $D_s$=|V|=|P|+2;

$D_t$: a constant representing the fixed heights of the sink: Dt=0;

D(p): a table of node heights such that 0≦D(p)<2$D_s$ for all nodes p;

X(p): a table of flow excesses such that X(p)≧0 at each node p;

T(p): a table of residual capacities for t-links at each node p where T(p)>0 indicates a capacity to the source and T(p)<0 indicates a capacity to the sink;

$E_n$(p): a table of residual capacities for n-links n∈N at each node p: $E_n$(p)≧0.

According to an embodiment of the invention, parallel steps can be implemented via fragment programs that are possible on GPUs. Each fragment program can be run in parallel over all nodes. Referring again to FIG. 1, a first step is to initialize the data structures, after which, a push-relabel implementation according to an embodiment of the invention runs in pulses until a stop criterion is met. One exemplary, non-limiting such criteria is X (p)=0 for all p∈P. Each pulse includes several steps implemented in parallel via fragment programs. Once in a while the sequences of pulses can be optionally interrupted for a global relabeling, as determined by the value of max_counter in the for loop in the pseudo-code. This relabeling could also be GPU-accelerated as indicated in the fragment program FRAG-BFS shown in FIG. 4 and described below. In practice, global relabeling heuristics are known to significantly speed-up the algorithm even though they do not change its theoretical complexity.

FIG. 2 presents a pseudo-code implementation of an exemplary, non-limiting initialization procedure for the data structures. A first step is to initialize the flow excess table X(p) and the t-link capacity table T(p) for all nodes, as a function of the source and sink t-link costs. This can be implemented by the procedure FRAG_XT_INIT, shown in FIG. 3. Referring to FIG. 3, the assignments to T(p) and X(p) can be performed in parallel for all nodes p. In addition, the n-link capacity table $E_n$(p) is initialized as a function of the n-link costs. One implementation of the $E_n$(p) initialization according to an embodiment of the invention is the procedure FRAG_COPY presented in FIG. 5, which can copy (in parallel) values of the cost table C at each node (pixel) into a specified output buffer (here the n-link capacity table). The data initialization is completed by using the t-link capacity table and the n-link capacity table to initialize the node height table, which can be performed in parallel by the procedure FRAG_BFS, which is explained below.

FIG. 4 presents a pseudo-code implementation of FRAG_BFS, which initializes and relabels the node height table. Referring to FIG. 4, the first assignment to D(p) is performed in parallel for all nodes p, however, the assignment to tmp(p) and the update of tmp(p) to D(p), each of which can be performed in parallel for all nodes p, is repeated for all vertices, including the source and sink.

There are different ways to implement pulses using a GPU. One implementation according to an embodiment of the invention is presented in FIG. 6, while another implementation according to an embodiment of the invention is presented in FIG. 7. These implementation are exemplary and show how different combinations of fragment programs can be used to implement pulse processing. In each of these versions, new values of the t-link and n-link capacity tables and flow excess table are calculated based on the node height table and previous values of the t-link and n-link capacity tables and flow excess table. The t-link and n-link capacities are updated using intermediate values referred to as, respectively, t-link pushes and n-link pushes. The new values of the t-link and n-link capacity tables and flow excess table are then used to update the node height table. In the first version, shown in FIG. 6, the t-link pushes and t-link capacities are updated before the n-link pushes and n-link capacities are calculated and updated, while in the second version, shown in FIG. 7, the t-link pushes and n-link pushes are calculated before updating the t-link capacities and n-link capacities. Details of the procedures performing these steps are given in FIGS. 8-12.

FIG. 8 presents a pseudo-code implementation of FRAG_T_PUSH, according to an embodiment of the invention. An intermediate function F(p), referred to as a t-link push, used for updating the flow excess table and the t-link capacity table, is calculated in parallel for each node p as a function of the flow excess table, the t-link capacity table, and the node height table.

FIG. 9 presents a pseudo-code implementation of FRAG_T_UPDATE, which uses the push function F(p) returned from FRAG_T_PUSH to update the flow excess table and the t-link capacity table in parallel for each node.

FIG. 10 presents a pseudo-code implementation of FRAG_N_PUSH, according to an embodiment of the invention. An intermediate function F(p), referred to as the n-link push, used for updating the flow excess table and n-link capacity table, is calculated in parallel for each node p as a function of the flow excess table, the n-link capacity table, and the node height table. Note that this parallel calculation is performed for each pair of n-links (n, rev(n)).

FIG. 11 presents a pseudo-code implementation of FRAG_N_UPDATE, which uses the push function F(p) returned from FRAG_N_PUSH to update the flow excess table and the n-link capacity table in parallel for each node. Again, this parallel calculation is performed for each pair of n-links (n, rev(n)).

FIG. 12 presents a pseudo-code implementation of FRAG_RELABEL, which uses the updated values of the t-link capacity label and the n-link capacity table to update the node height table. Again, the initialization of tmp(p) and the subsequent assignment of tmp(p) to D(p) are each performed in parallel for app nodes p.

Note that FRAG_PUSH, referred to in the second version of the pulse processing depicted in FIG. 7, is a straightforward combination of the FRAG_T_PUSH and FRAG_N_PUSH procedures. Other modifications of pulse implementation are within the scope of the invention. For example, some fragment procedures can be combined and others can be split into independent units. For example, FRAG_T_PUSH and FRAG_T_UPDATE could be combined into one fragment procedure. Similarly, FRAG_N_PUSH and FRAG_N_UPDATE could be combined into one fragment procedure. On the other hand, updating of X in FIG. 7 is independent from T and $E_n$ and can be singled out in a separate fragment program.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Referring now to FIG. 13, according to an embodiment of the present invention, a computer system 101 for implementing the present invention can comprise, inter alia, a central processing unit (CPU) 102, a graphics processing unit 109, a memory 103 and an input/output (I/O) interface 104. The computer system 101 is generally coupled through the I/O interface 104 to a display 105 and various input devices 106 such as a mouse and a keyboard. The support circuits can include circuits such as cache, power supplies, clock circuits, and a communication bus. The memory 103 can include random access memory (RAM), read only memory (ROM), disk drive, tape drive, etc., or a combinations thereof. The present invention can be implemented as a routine 107 that is stored in memory 103 and executed by the CPU 102 and GPU 109 to process a signal from a signal source 108. As such, the computer system 101 is a general purpose computer system that becomes a specific purpose computer system when executing the routine 107 of the present invention.

The computer system 101 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

Figure 15:
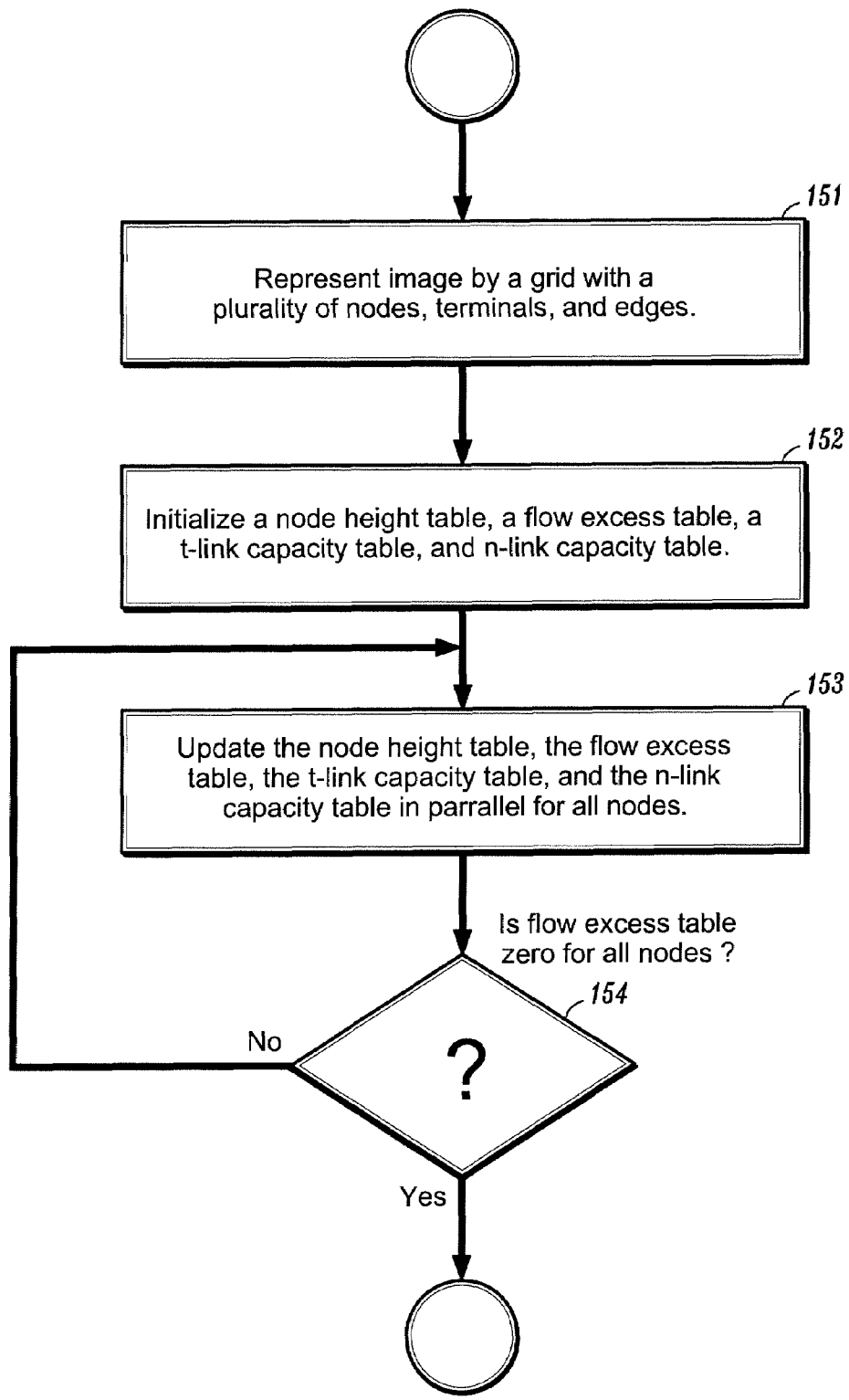
FIG. 15 is a flowchart of a method for GPU-based acceleration of a push-relabel algorithm on grids, according to an embodiment of the invention.

A flowchart of a method for GPU-based acceleration of a push-relabel segmentation algorithm on grids is presented in FIG. 15. Referring now to the figure, segmentation begins at step 151 by representing an image by a grid with a plurality of nodes, terminals, and edges. The nodes correspond to voxels in the image, the terminals include a source and a sink, and the edges include n-links and t-links, where each n-link connects a pair a nodes, and the t-links connect a node to a terminal. Each t-link and n-link has an associated cost. At step 152, a node height table, a flow excess table, a t-link capacity table, and an n-link capacity table are initialized based on the t-link and n-link costs. At step 153, the node height table, the flow excess table, the t-link capacity table, and the n-link capacity table are updated in parallel for all nodes using the GPU. At step 154, the flow excess table is checked to determine if it is zero for all nodes. If so, the nodes have been segmented into a sink sec and a source set based on the values of the node height table, otherwise step 153 is repeated until the flow excess table is zero for all nodes.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of segmenting an image comprising the steps of:
    representing an image by a grid with a plurality of nodes, terminals, and edges, wherein said nodes correspond to voxels in the image, said terminals include a source and a sink, and wherein said edges include n-links and t-links, wherein each n-link connects a pair of nodes, and said t-links connect a node to a terminal, and wherein each t-link and n-link has an associated cost;
    initializing a node height table, a flow excess table, a t-link capacity table, and an n-link capacity table based on the t-link and n-link costs; and
    updating said node height table, said flow excess table, said t-link capacity table, and said n-link capacity table in parallel for all nodes until said flow excess table is zero for all nodes, wherein said nodes are segmented into a sink set and a source set based on the values of the node height table,
    wherein each n-link is associated with a reverse n-link among the n-links, and wherein said parallel updating further comprises the steps of
        determining for all nodes in parallel a t-link push based on the t-link capacity table and the flow excess table, and using the t-link push to update the t-link capacity table and flow excess table in parallel for all nodes;
        determining for all nodes in parallel an n-link push based on the n-link capacity table and the flow excess table, and using the n-link push to update the n-link capacity table and flow excess table in parallel for all nodes, wherein the step of determining an n-link push and updating the n-link capacity table and flow excess table is repeated for every n-link pair comprising an n-link and its reverse; and
        updating the node height table based on the undated t-link capacity table and updated n-link capacity table, for all nodes in parallel.

2. The method of claim 1, wherein said parallel updating of said node height table, said flow excess table, said t-link capacity table, and said n-link capacity table is performed on a graphics processing unit.

3. The method of claim 1, further including the step of periodically recalculating the node height table in parallel for all nodes, based on updated values of the t-link capacity table and the n-link capacity table.

4. The method of claim 3, wherein the step of periodically recalculating the node height table further comprises the steps of:
    reinitializing, in parallel for all nodes, the node heights from a source height and a sink height, as determined by the t-link capacity table;
    determining in parallel for all nodes and for all n-links a temporary height table, based on the n-link capacity table; and
    updating the node height table from the temporary height table, in parallel for all nodes, wherein the steps of determining a temporary height table and updating the node height table are repeated for all nodes and terminals.

5. The method of claim 1, wherein the step of updating the flow excess table further comprises the steps of:
    initializing, in parallel for all nodes, a temporary height table from a source height and a sink height, as determined by the t-link capacity table, and, for each n-link, updating said temporary height table based on the n-link capacity table; and
    updating in parallel for each node the node height table from the temporary height table.

6. A method of segmenting an image comprising the steps of:
    representing an image by a grid with a plurality of nodes, terminals, and edges, wherein said nodes correspond to voxels in the image, said terminals include a source and a sink, and wherein said edges include n-links and t-links, wherein each n-link connects a pair of nodes, and said t-links connect a node to a terminal, and wherein each t-link and n-link has an associated cost;
    initializing a node height table, a flow excess table, a t-link capacity table, and an n-link capacity table based on the t-link and n-link costs; and
    updating said node height table, said flow excess table, said t-link capacity table, and said n-link capacity table in parallel for all nodes until said flow excess table is zero for all nodes, wherein said nodes are segmented into a sink set and a source set based on the values of the node height table,
    wherein each n-link is associated with a reverse n-link among the n-links, and wherein said parallel updating further comprises the steps of:
        determining for all nodes in parallel an n-link push and a t-link push based on the n-link capacity table, the t-link capacity table and the flow excess table;
        updating the t-link capacity table from the t-link push in parallel for all nodes;
        updating the n-link capacity table from the n-link push in parallel for all nodes, wherein the step of determining an n-link push and updating the n-link capacity table and flow excess table is repeated for every n-link pair comprising an n-link and its reverse;
        updating the flow excess table from the n-link push and t-link push in parallel for all nodes; and
        updating the node height table based on the updated t-link capacity table and updated n-link capacity table, for all nodes in parallel.

7. The method of claim 6, wherein the step of updating the flow excess table further comprises the steps of:
    initializing, in parallel for all nodes, a temporary height table from a source height and a sink height, as determined by the t-link capacity table, and, for each n-link, updating said temporary height table based on the n-link capacity table; and
    updating in parallel for each node the node height table from the temporary height table.

8. A system for partitioning a grid using a graphics processing unit, said grid comprising a plurality of nodes, terminals, and edges, said terminals include a source and a sink, and wherein said edges include n-links and t-links, wherein each n-link connects a pair of nodes, and said t-links connect a node to a terminal, and wherein each t-link and n-link has an associated cost, said system comprising:

a node height table;
a flow excess table;
a t-link capacity table;
an n-link capacity table;
a plurality of initialization procedures for initializing said node height table, said flow excess table, said t-link capacity table, and said n-link capacity table; and
a plurality of pulse processing procedures for updating said node height table, said flow excess table, said t-link capacity table, and said n-link capacity table, wherein said pulse processing procedures are executed until a stopping criteria is satisfied, and wherein said plurality of initialization and said pulse processing procedures are fragment programs executable in parallel for each node in the grid by said graphics processing unit,
wherein said pulse processing procedures further comprises
a plurality of fragment programs for calculating a t-link push table from said t-link capacity table and flow excess table based on said node height table;
a plurality of fragment programs for updating said t-link capacity table and flow excess table from said t-link push table;
a plurality of fragment programs for calculating an n-link push table from said n-link capacity table and flow excess table based on said node height table;
a plurality of fragment programs for updating said n-link capacity table and flow excess table from said n-link push table; and
a plurality of fragment programs for updating said node height table from said n-link capacity table and said t-link capacity table,
wherein said fragment programs are executable in parallel for each node in the grid by said graphics processing unit.

9. The system of claim 8, wherein said node height table, said flow excess table, said t-link capacity table, and said n-link capacity table are initialized from a cost associated with each n-link and each t-link.

10. The system of claim 8, further comprising a plurality of fragment procedures for performing a global relabeling of said node height table, wherein said fragment programs are executable in parallel for each node in the grid by said graphics processing unit.

11. The system of claim 8, wherein said stopping criteria is based on said flow excess being about zero for all nodes in the grid, wherein the grid is partitioned based on the values of the node height table.

12. A program storage device readable by a computer, tangibly embodying a program of instructions executable by the computer to perform the method steps for segmenting an image, said method comprising the steps of:

representing an image by a grid with a plurality of nodes, terminals, and edges, wherein said nodes correspond to voxels in the image, said terminals include a source and a sink, and wherein said edges include n-links and t-links, wherein each n-link connects a pair of nodes, and said t-links connect a node to a terminal, and wherein each t-link and n-link has an associated cost;
initializing a node height table, a flow excess table, a t-link capacity table, and an n-link capacity table based on the t-link and n-link costs; and
updating said node height table, said flow excess table, said t-link capacity table, and said n-link capacity table in parallel for all nodes until said flow excess table is zero for all nodes, wherein said nodes are segmented into a sink set and a source set based on the values of the node height table,
wherein each n-link is associated with a reverse n-link among the n-links, and wherein said parallel updating further comprises the steps of:
determining for all nodes in parallel a t-link push based on the t-link capacity table and the flow excess table, and using the t-link push to update the t-link capacity table and flow excess table in parallel for all nodes;
determining for all nodes in parallel an n-link push based on the n-link capacity table and the flow excess table, and using the n-link push to update the n-link capacity table and flow excess table in parallel for all nodes, wherein the step of determining an n-link push and updating the n-link capacity table and flow excess table is repeated for every n-link pair comprising an n-link and its reverse; and
updating the node height table based on the undated t-link capacity table and updated n-link capacity table, for all nodes in parallel.

13. The computer readable program storage device of claim 12, wherein said parallel updating of said node height table, said flow excess table, said t-link capacity table, and said n-link capacity table is performed on a graphics processing unit.

14. The computer readable program storage device of claim 12, the method further including the step of periodically recalculating the node height table in parallel for all nodes, based on updated values of the t-link capacity table and the n-link capacity table.

15. The computer readable program storage device of claim 14, wherein the step of periodically recalculating the node height table further comprises the steps of:
reinitializing, in parallel for all nodes, the node heights from a source height and a sink height, as determined by the t-link capacity table;
determining in parallel for all nodes and for all n-links a temporary height table, based on the n-link capacity table; and
updating the node height table from the temporary height table, in parallel for all nodes, wherein the steps of determining a temporary height table and updating the node height table are repeated for all nodes and terminals.

16. The computer readable program storage device of claim 12, wherein the step of updating the flow excess table further comprises the steps of:
initializing, in parallel for all nodes, a temporary height table from a source height and a sink height, as determined by the t-link capacity table, and, for each n-link, updating said temporary height table based on the n-link capacity table; and
updating in parallel for each node the node height table from the temporary height table.

17. A program storage device readable by a computer, tangibly embodying a program of instructions executable by the computer to perform the method steps for segmenting an image, said method comprising the steps of:
representing an image by a grid with a plurality of nodes, terminals, and edges, wherein said nodes correspond to voxels in the image, said terminals include a source and a sink, and wherein said edges include n-links and t-links, wherein each n-link connects a pair of nodes, and said t-links connect a node to a terminal, and wherein each t-link and n-link has an associated cost;

initializing a node height table, a flow excess table, a t-link capacity table, and an n-link capacity table based on the t-link and n-link costs; and updating said node height table, said flow excess table, said t-link capacity table, and said n-link capacity table in parallel for all nodes until said flow excess table is zero for all nodes, wherein said nodes are segmented into a sink set and a source set based on the values of the node height table, wherein each n-link is associated with a reverse n-link among the n-links, and wherein said parallel updating further comprises the steps of:

determining for all nodes in parallel an n-link push and a t-link push based on the n-link capacity table, the t-link capacity table and the flow excess table;

updating the t-link capacity table from the t-link push in parallel for all nodes;

updating the n-link capacity table from the n-link push in parallel for all nodes, wherein the step of determining an n-link push and updating the n-link capacity table and flow excess table is repeated for every n-link pair comprising an n-link and its reverse;

updating the flow excess table from the n-link push and t-link push in parallel for all nodes; and updating the node height table based on the updated t-link capacity table and updated n-link capacity table, for all nodes in parallel.

18. The computer readable program storage device of claim 17, wherein the step of updating the flow excess table further comprises the steps of:

initializing, in parallel for all nodes, a temporary height table from a source height and a sink height, as determined by the t-link capacity table, and, for each n-link, updating said temporary height table based on the n-link capacity table; and updating in parallel for each node the node height table from the temporary height table.

* * * * *

UNITED STATES PATENT AND TRADEMARK OFFICE
CERTIFICATE OF CORRECTION

PATENT NO. : 7,444,019 B2  Page 1 of 1
APPLICATION NO. : 11/058336
DATED : October 28, 2008
INVENTOR(S) : Yuri Boykov and Gianluca Paladini It is certified that error appears in the above-identified patent and that said Letters Patent is hereby corrected as shown below:

On the Title Page, Item (54) Title
The TITLE should be listed as:

-SYSTEM AND METHOD FOR GPU ACCELERATION OF PUSH-RELABEL ALGORITHM ON GRIDS-

Signed and Sealed this

Third Day of March, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,444,019 B2  Page 1 of 1
APPLICATION NO. : 11/058336
DATED : October 28, 2008
INVENTOR(S) : Yuri Boykov and Gianluca Paladini It is certified that error appears in the above-identified patent and that said Letters Patent is hereby corrected as shown below:

On the Title Page, Item (54) and Column 1, lines 1-3, Title
The TITLE should be listed as:

-SYSTEM AND METHOD FOR GPU ACCELERATION OF PUSH-RELABEL ALGORITHM ON GRIDS-

This certificate supersedes the Certificate of Correction issued March 3, 2009.

Signed and Sealed this

Thirty-first Day of March, 2009

JOHN DOLL
*Acting Director of the United States Patent and Trademark Office*